(12) United States Patent
Matsunaga et al.

(10) Patent No.: US 8,387,586 B2
(45) Date of Patent: Mar. 5, 2013

(54) FUEL INJECTION CONTROL APPARATUS OF INTERNAL COMBUSTION ENGINE

(75) Inventors: Akio Matsunaga, Miyoshi (JP); Mitsuhiro Nada, Toyota (JP); Yasuyuki Terada, Toyota (JP); Makio Tsuchiyama, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 438 days.

(21) Appl. No.: 12/746,404

(22) PCT Filed: Oct. 31, 2008

(86) PCT No.: PCT/JP2008/003135
§ 371 (c)(1),
(2), (4) Date: Aug. 9, 2010

(87) PCT Pub. No.: WO2009/072234
PCT Pub. Date: Jun. 11, 2009

(65) Prior Publication Data
US 2010/0305833 A1    Dec. 2, 2010

(30) Foreign Application Priority Data
Dec. 7, 2007  (JP) .................................. 2007-316993

(51) Int. Cl.
*F02B 17/00*    (2006.01)

(52) U.S. Cl. ........................................ 123/295; 123/305

(58) Field of Classification Search .................... 123/295, 123/304, 305; 701/103–105
See application file for complete search history.

(56) References Cited

U.S. PATENT DOCUMENTS

| | | | | |
|---|---|---|---|---|
| 4,176,651 | A * | 12/1979 | Backus | 123/27 GE |
| 6,622,690 | B2 * | 9/2003 | Ando et al. | 123/295 |
| 7,055,495 | B2 * | 6/2006 | Yamaoka et al. | 123/305 |
| 7,334,398 | B2 * | 2/2008 | Kitahara | 60/285 |
| 7,421,999 | B2 * | 9/2008 | Kim et al. | 123/295 |
| 7,509,932 | B2 * | 3/2009 | Hara et al. | 123/90.15 |
| 7,520,260 | B2 * | 4/2009 | Nakamura et al. | 123/299 |
| 2006/0272608 | A1 * | 12/2006 | Hara et al. | 123/182.1 |
| 2011/0005491 | A1 * | 1/2011 | Terada et al. | 123/299 |

FOREIGN PATENT DOCUMENTS

| | | |
|---|---|---|
| DE | 103 44 423 A1 | 4/2005 |
| DE | 10 2006 061659 A1 | 7/2008 |
| EP | 1 348 858 A1 | 10/2003 |
| EP | 1 568 876 A2 | 8/2005 |
| JP | 2000-154757 A | 6/2000 |
| JP | 2001-254645 A | 9/2001 |
| JP | 2004-308440 A | 11/2004 |
| JP | 3835238 B2 | 8/2006 |
| JP | 2006-274997 A | 10/2006 |

* cited by examiner

*Primary Examiner* — John Kwon
(74) *Attorney, Agent, or Firm* — Kenyon & Kenyon LLP

(57) ABSTRACT

In one embodiment, a determination is made of whether or not in a condition in which a compressed gas temperature will reach a fuel self-ignition temperature by only a compression operation in the compression stroke, and in a case where the compressed gas temperature will reach the fuel self-ignition temperature, pilot injection is judged to be unnecessary, so this pilot injection is prohibited.

5 Claims, 6 Drawing Sheets

FUEL INJECTION CONTROL APPARATUS OF INTERNAL COMBUSTION ENGINE

This is a 371 national phase application of PCT/JP2008/003135 filed 31 Oct. 2008, which claims priority to Japanese Patent Application No. 2007-316993 filed 7 Dec. 2007, the contents of which are incorporated herein by reference.

FIELD OF THE INVENTION

The present invention relates to a fuel injection control apparatus of an internal combustion engine represented by a diesel engine. More specifically, the present invention relates to, with respect to a compression self-igniting internal combustion engine in which it is possible to execute sub injection (also referred to below as pilot injection) prior to main injection from a fuel injection valve, a measure for achieving optimization of this sub injection.

BACKGROUND OF THE INVENTION

As is conventionally known, in a diesel engine used as an automobile engine or the like, fuel injection control is performed that adjusts a fuel injection timing and a fuel injection amount from a fuel injection valve (also referred to below as an injector) according to an operating state, such as the engine revolutions, amount of accelerator operation, coolant temperature, and intake air temperature.

Incidentally, diesel engine combustion is composed of premixed combustion and diffusive combustion. When fuel injection from a fuel injection valve begins, first a combustible mixture is produced by vaporization and diffusion of fuel (ignition delay period). Next, this combustible mixture self-ignites at about the same time at numerous places in a combustion chamber, and combustion rapidly progresses (premixed combustion). Further, fuel injection into the combustion chamber is continued, so that combustion is continuously performed (diffusive combustion). Afterward, unburned fuel exists even after fuel injection has ended, so heat continues to be generated for some period of time (after-burning period).

Also, in a diesel engine, as the ignition delay period grows longer, or as the vaporization of fuel during the ignition delay period grows more intense, a flame propagation speed after ignition will increase. When this flame propagation speed is large, the amount of fuel that burns at once becomes too great, pressure inside the cylinder drastically increases, and so vibration or noise occurs. Such a phenomenon is called diesel knocking, and often occurs particularly when operating with a low load. Also, in this sort of situation, a drastic elevation in burn temperature is accompanied by an increase in the amount of nitrogen oxide (referred to below as "NOx") produced, and thus exhaust emissions become worse.

Consequently, in order to prevent such diesel knocking and reduce the amount of NOx produced, various fuel injection control apparatuses have been developed. For example, a fuel injection control apparatus has been developed whereby pilot injection that injects a small amount of fuel is performed prior to main injection that causes combustion contributing to the production of engine torque. That is, there have been proposals in which, after executing pilot injection, fuel injection is temporarily interrupted, and when that fuel has reached an ignition state (a so-called flash point), main injection is executed (see below Patent Citations 1 to 3).

By executing this sort of pilot injection, it is possible to mitigate the initial combustion that accompanies the start of subsequent main injection, and thus it is possible to suppress the occurrence of diesel knocking. Also, the fuel injected in pilot injection is already ignited when executing main injection, and the flash point state has already been established, so it is also possible to avoid the occurrence of misfire. Therefore, with pilot injection, low temperature starting is improved, and the occurrence of white smoke at low temperature also is reduced. Furthermore, with this pilot injection, the amount of fuel injection during the ignition delay period is reduced, so premixed combustion also is suppressed. Also, during the premixed combustion, the heat generation rate is high, so it is possible that generation of NOx will be promoted, but because the premixed combustion is suppressed with the above pilot injection, the production of NOx and the production of noise that accompanies the premixed combustion are both likewise reduced.

However, in order to perform pilot injection of a small amount of fuel, it is necessary to control the amount of this pilot injection with high precision. For example, in Patent Citation 2, pilot injection is executed such that a compression end pressure, which is the maximum pressure that occurs within the cylinder in the engine compression stroke, approaches a target compression end pressure. In this case, a smaller amount of pilot injection is set as the difference between the target compression end pressure and the actual compression end pressure grows smaller.

Also, Patent Citation 3 discloses increasing the amount of pilot injection as the intake air temperature decreases, and as the intake air pressure increases.

[Patent Citation 1]
JP 2004-308440A
[Patent Citation 2]
JP 2000-154757A
[Patent Citation 3]
JP 2006-274997A

SUMMARY OF THE INVENTION

Technical Problem

However, with respect to conventional control of pilot injection, although adjustment to increase or reduce the amount of pilot injection has been considered, a control logic for the pilot injection, for example to appropriately judge whether or not pilot injection is necessary, has not been established, so it has not been certain that proper pilot injection control is being performed.

The following can be cited as the causes of this problem, for example. Ordinarily, pilot injection has functions of appropriately controlling ignition and appropriately controlling heat generation rate during main injection, but in conventional pilot injection, those functions are not clearly separated. As a result, often pilot injection is executed even in a situation in which it is possible to insure adequate ignition even if only main injection is executed, i.e., even if pilot injection is not executed, so there is a high possibility that pilot injection is being executed more than is necessary. In such a case in which pilot injection is being executed more than is necessary, there is a concern that exhaust emissions will worsen (a concern that with excessive pilot injection, the amount of HC or PM produced will increase due to the occurrence of localized oxygen insufficiency), or that the rate of fuel consumption will worsen.

It is an object of the present invention to provide, for an internal combustion engine made capable of executing pilot injection prior to main injection, a control logic for pilot injection execution that is capable of judging whether or not pilot injection is necessary.

Technical Solution

Principles of Solution

The principles of the solution of the present invention are as follows. The function of sub injection is specialized for preheating the inside of a cylinder. When a gas (air) that has been sucked into the cylinder is in a condition such that the gas will reach a fuel self-ignition temperature by only a compression operation in the compression stroke, it is judged that sub injection prior to main injection is not necessary, this sub injection is prohibited, and thus it is possible to avoid wasteful sub injection. On the other hand, when the gas that has been sucked into the cylinder is in a condition such that the gas will not reach the fuel self-ignition temperature by only the compression operation in the compression stroke, sub injection is executed prior to main injection, and thus it is made possible for ignition of the fuel during main injection to be well-insured.

Solving Means

The present invention provides a fuel injection control apparatus of a compression self-igniting internal combustion engine that, as an operation to inject fuel from a fuel injection valve, is capable of executing at least a main injection and a sub injection that is performed prior to the main injection, the fuel injection control apparatus being provided with: a compressed gas temperature identification portion that estimates or detects a compressed gas temperature that only increases due to compression of gas in a cylinder during a compression stroke in a case where it is assumed that the sub injection is not executed; and a sub injection control portion that compares the compressed gas temperature estimated or detected by the compressed gas temperature identification portion to a fuel self-ignition temperature, and executes the sub injection prior to the main injection only when the compressed gas temperature is lower than the fuel self-ignition temperature.

With this specific configuration, for example, an operation to estimate or detect the compressed gas temperature in the compression stroke in the internal combustion engine is performed by the compressed gas temperature identification portion. More specifically, the compressed gas temperature identification portion estimates or detects a compressed gas temperature that only increases due to compression of gas in a cylinder during a compression stroke in a case where it is assumed that the sub injection is not executed. If this compressed gas temperature is at least the fuel self ignition temperature, fuel is self-ignitable in only main injection after this compression stroke. On the other hand, if the compressed gas temperature is less than the fuel self-ignition temperature, there is a high possibility that good self-ignition of fuel will not be obtained in only main injection after this compression stroke. Therefore, the sub injection control portion compares the compressed gas temperature estimated or detected by the compressed gas temperature identification means to the fuel self-ignition temperature, and only in a case where that compressed gas temperature is lower than the fuel self-ignition temperature, executes sub injection prior to the main injection, and performs an operation to preheat gas within the combustion chamber that accompanies this sub injection, so that when the timing for execution of main injection is reached, the gas temperature within the cylinder has become at least the fuel self-ignition temperature. With this configuration, the sub injection function is specialized for increasing temperature by supplying heat energy into the combustion chamber, and is functionally separated from other fuel injection operations, and in addition, sub injection is executed only when preheating is necessary in order to insure ignition of fuel, so wasteful sub injection is avoided. As a result, it is possible to prevent worsening of exhaust emissions caused by executing sub injection more than is necessary, and worsening of the rate of fuel consumption.

Information of the compressed gas temperature estimated or detected by the compressed gas temperature identification means is used for determining whether or not to execute sub injection that is performed prior to main injection immediately after this compression stroke for which the estimation or detection was performed. That is, the information of the compressed gas temperature acquired in the compression stroke is used for determining whether or not to execute sub injection performed prior to main injection immediately after the compression stroke for that information. The invention is not limited to this; a configuration may also be adopted in which the information of this compressed gas temperature is used for a determination of whether or not to execute sub injection performed prior to main injection in the next cylinder (the next cylinder to enter an expansion stroke after the expansion stroke of the cylinder for which the compressed gas temperature information was acquired), or a configuration may be adopted in which this information is used for a determination of whether or not to execute sub injection performed prior to main injection that is immediately after the next instance of the compression stroke for this cylinder (in the case of a four cylinder internal combustion engine, the compression stroke that occurs four instances later than when this compressed gas temperature information was acquired).

Alternatively, the present invention provides a fuel injection control apparatus of a compression self-igniting internal combustion engine that, as an operation to inject fuel from a fuel injection valve, is capable of executing at least a main injection and a sub injection that is performed prior to the main injection, the fuel injection control apparatus being provided with: a compressed gas temperature identification portion that estimates or detects a compressed gas temperature that only increases due to compression of gas in a cylinder during a compression stroke in a case where it is assumed that the sub injection is not executed; and a sub injection control portion that compares the compressed gas temperature estimated or detected by the compressed gas temperature identification portion to a fuel self-ignition temperature, and prohibits execution of the sub injection when the compressed gas temperature is at least the fuel self-ignition temperature.

With this specific configuration, same as in the case of the solving means described above, sub injection is executed only when conditions require sub injection to insure ignition of fuel, and thus it is possible to avoid wasteful sub injection. As a result, it is possible to prevent worsening of exhaust emissions caused by executing sub injection more than is necessary, and worsening of the rate of fuel consumption.

Following is an example of a specific configuration when estimation or detection of the compressed gas temperature is performed by the compressed gas temperature identification portion. That is, a target ignition timing setting portion is provided that sets a target ignition timing at which fuel is ignited by the main injection, and the compressed gas temperature identification portion estimates or detects the compressed gas temperature at the target ignition timing that has been set by the target ignition timing setting portion. For example, when the target ignition timing has been set to the time when a piston that moves back and forth in a cylinder has reached a compression top dead center (for example, in the case of operation in which output torque of the internal combustion engine is considered important), the compressed gas temperature is estimated or detected when the compression top dead center is reached. On the other hand, when the target ignition timing has been set to the time when the piston has reached an angle later than the compression top dead center (ATDC side)(for example, in the case of operation in which suppression of the amount of NOx exhaust is considered important), the compressed gas temperature at the time when this angle later than the compression top dead center is reached is estimated or detected. Note that the target ignition timing is set in consideration of a fuel injection period and a subsequent operation delay.

According to this configuration, it is possible to identify the compressed gas temperature at the timing that fuel is actually ignited (the target ignition timing), compare the compressed gas temperature at that timing to the fuel self-ignition temperature, and then judge the necessity of sub injection. In other words, when the compressed gas temperature at a timing outside of the target ignition timing is compared to the fuel self-ignition temperature to judge whether or not sub injection is necessary, there is a possibility that sub injection will not be executed although sub injection is necessary, or that unnecessary sub injection will be executed, and thus a fuel ignition operation in the target ignition timing will become impossible. In consideration of this point, according to this solving means, by comparing the compressed gas temperature at the timing that main injection is actually performed and fuel is ignited (the target ignition timing) to the fuel self-ignition temperature, it is possible to more precisely judge the necessity of sub injection, and thus the fuel ignition timing can be matched to the target ignition timing.

Following is an example of an operation to set the amount of injection when executing the sub injection. That is, when executing sub injection, the sub injection control portion sets a larger total fuel injection amount for sub injection as the difference between the compressed gas temperature and the fuel self-ignition temperature increases.

That is, a case in which sub injection is executed is a case in which the compressed gas temperature (for example, the compressed gas temperature at the target ignition timing) is less than the fuel self-ignition temperature, and the fact that there is a large difference between the compressed gas temperature and the fuel self-ignition temperature means that a large amount of heat is necessary in order to raise the compressed gas temperature to the fuel self-ignition temperature. Therefore, a larger fuel injection amount by sub injection is set as the difference between the compressed gas temperature and the fuel self-ignition temperature increases, and after executing sub injection, the compressed gas temperature is raised to the fuel self-ignition temperature within a short period, so at the time that main injection is executed, a condition is realized in which ignition of fuel is well-insured.

In this case, as an operation by the sub injection control apparatus to control sub injection from the fuel injection valve, specifically, the sub injection control portion divides the total fuel injection amount for sub injection set based on the difference between the compressed gas temperature and the fuel self-ignition temperature into a plurality of instances of injection, and performs injection intermittently.

For example, in a case where there is a large difference between the compressed gas temperature and the fuel self-ignition temperature, and so the total fuel injection amount by sub injection is also large, when a large amount of fuel is injected with one instance of sub injection, an ignition delay of the fuel itself that has been injected by this sub injection occurs, so it becomes impossible to adequately increase the temperature in the cylinder (gas temperature) at the time of main injection, and there is a possibility that this will lead to a worsening of exhaust emissions caused by the sub injection ignition delay, or increased combustion sound. Therefore, with this solving means, by dividing the total fuel injection amount for sub injection into a plurality of instances of injection, and performing injection intermittently, the ignition delay per one instance of sub injection is shortened, and the amount of heat obtained by previously executed sub injection contributes to further shortening the ignition delay of fuel that has been injected in subsequent sub injection. Thus, even when the total fuel injection amount for sub injection is large, the preheating function of this sub injection is exhibited well, and as a result the effects of sub injection can be reliably obtained.

Advantageous Effects

With the present invention, with respect to a compression self-igniting internal combustion engine, in a condition that the inside of a compression chamber will reach a fuel self-ignition temperature by only a compression operation in the compression stroke, it is judged that sub injection prior to main injection is not necessary, this sub injection is prohibited, and thus it is possible to avoid wasteful sub injection. Therefore, it is possible to execute sub injection only in a case where sub injection is necessary in order to insure ignition of fuel that has been injected by main injection, thus avoiding wasteful sub injection. As a result, it is possible to prevent worsening of exhaust emissions caused by executing sub injection more than is necessary, and worsening of the rate of fuel consumption.

BRIEF DESCRIPTION OF THE DRAWINGS

FIG. 3 is a block diagram that shows the configuration of a control system of an ECU or the like.

EXPLANATION OF REFERENCE

1 Engine (internal combustion engine)
11 Cylinder block
13 Piston
23 Injector (fuel injection valve)

DETAILED DESCRIPTION

Following is a description of an embodiment of the invention based on the drawings. In the present embodiment, a case will be described in which the invention is applied to a common rail in-cylinder direct injection multi-cylinder (for example, inline four-cylinder) diesel engine (compression self-igniting internal combustion engine) mounted in an automobile.

—Engine Configuration—

Figure 1:
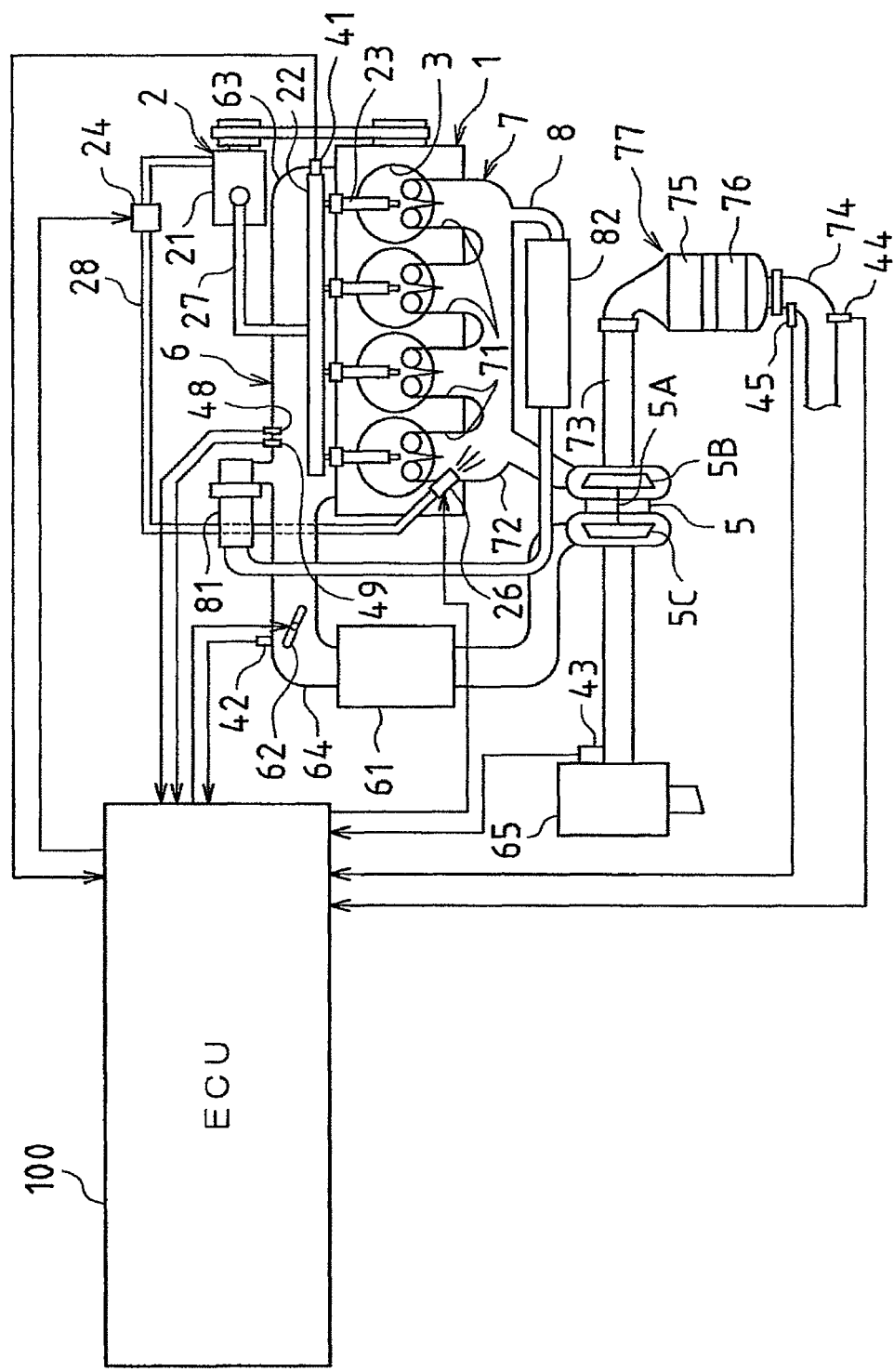
FIG. 1 is a schematic configuration diagram of an engine and a control system of that engine according to an embodiment.
Figure 2:
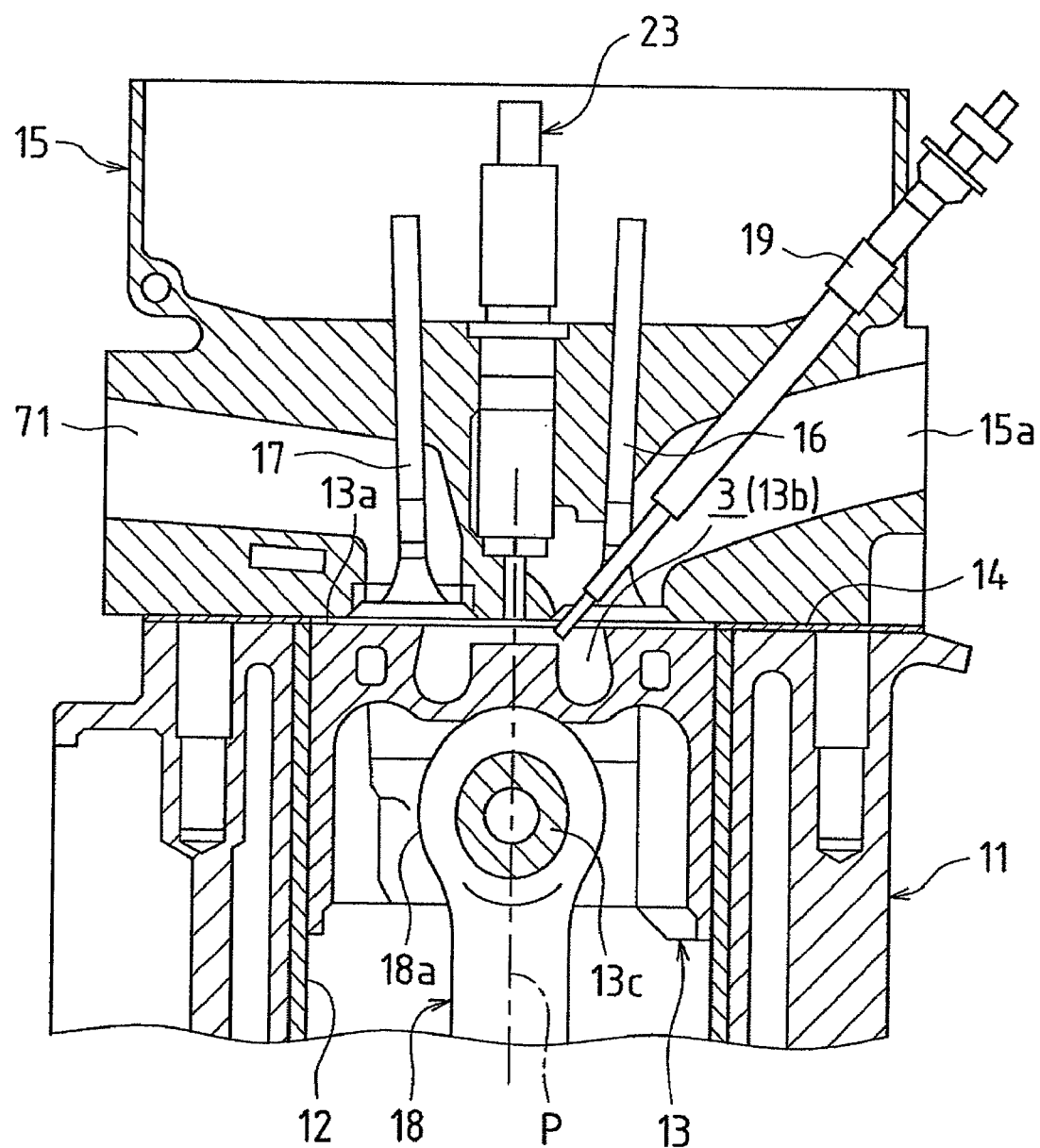
FIG. 2 is a cross-sectional view that shows a combustion chamber of a diesel engine and parts in the vicinity of that combustion chamber.

First, the overall configuration of a diesel engine (referred to below as simply the engine) according to the present embodiment will be described. FIG. 1 is a schematic configuration diagram of the engine 1 and a control system of the engine 1 according to this embodiment. FIG. 2 is a cross-sectional view that shows a combustion chamber 3 of the diesel engine and parts in the vicinity of the combustion chamber 3.

As shown in FIG. 1, the engine 1 according to this embodiment is a diesel engine system configured using a fuel supply system 2, combustion chambers 3, an intake system 6, an exhaust system 7, and the like as its main portions.

The fuel supply system 2 is provided with a supply pump 21, a common rail 22, injectors (fuel injection valves) 23, a cutoff valve 24, a fuel addition valve 26, an engine fuel path 27, an added fuel path 28, and the like.

The supply pump 21 draws fuel from a fuel tank, and after putting the drawn fuel under high pressure, supplies that fuel to the common rail 22 via the engine fuel path 27. The common rail 22 has a function as an accumulation chamber where high pressure fuel supplied from the supply pump 21 is held (accumulated) at a predetermined pressure, and this accumulated fuel is distributed to each injector 23. The injectors 23 are configured from piezo injectors within which a piezoelectric element (piezo element) is provided, and supply fuel by injection into the combustion chambers 3 by appropriately opening a valve. The details of control of fuel injection from the injectors 23 will be described later.

Also, the supply pump 21 supplies part of the fuel drawn from the fuel tank to the fuel addition valve 26 via the added fuel path 28. In the added fuel path 28, the aforementioned cutoff valve 24 is provided in order to stop fuel addition by cutting off the added fuel path 28 during an emergency.

The fuel addition valve 26 is configured from an electronically controlled opening/closing valve whose valve opening timing is controlled with an addition control operation by an ECU 100 described later such that the amount of fuel added to the exhaust system 7 becomes a target addition amount (an addition amount such that exhaust A/F becomes target A/F), or such that a fuel addition timing becomes a predetermined timing. That is, a desired amount of fuel from the fuel addition valve 26 is supplied by injection to the exhaust system 7 (to an exhaust manifold 72 from exhaust ports 71) at an appropriate timing.

The intake system 6 is provided with an intake manifold 63 connected to an intake port 15a formed in a cylinder head 15 (see FIG. 2), and an intake tube 64 that comprises an intake path is connected to the intake manifold 63. Also, in this intake path, an air cleaner 65, an airflow meter 43, and a throttle valve 62 are disposed in order from the upstream side. The airflow meter 43 outputs an electrical signal according to the amount of air that flows into the intake path via the air cleaner 65.

The exhaust system 7 is provided with the exhaust manifold 72 connected to the exhaust ports 71 formed in the cylinder head 15 (see FIG. 2), and exhaust tubes 73 and 74 that comprise an exhaust path are connected to the exhaust manifold 72. Also, in this exhaust path, a maniverter (exhaust purification apparatus) 77 is disposed that is provided with a NOx storage catalyst (NSR catalyst: NOx Storage Reduction catalyst) 75 and a DPNR catalyst (Diesel Particulate-NOx Reduction catalyst) 76, described later. Following is a description of the NSR catalyst 75 and the DPNR catalyst 76.

The NSR catalyst 75 is a storage reduction NOx catalyst, and is configured using alumina ($Al_2O_3$) as a support, with, for example, an alkali metal such as potassium (K), sodium (Na), lithium (Li), or cesium (Cs), an alkaline earth element such as barium (Ba) or calcium (Ca), a rare earth element such as lanthanum (La) or Yttrium (Y), and a precious metal such as platinum (Pt) supported on this support.

The NSR catalyst 75, in a state in which a large amount of oxygen is present in the exhaust, stores NOx, and in a state in which the oxygen concentration in the exhaust is low and a large amount of a reduction component (for example, an unburned component (HC) of fuel) is present, reduces NOx to $NO_2$ or NO and releases the resulting $NO_2$ or NO. NOx that has been released as $NO_2$ or NO is further reduced due to quickly reacting with HC or CO in the exhaust and becomes $N_2$. Also, by reducing $NO_2$ or NO, HC and CO themselves are oxidized and thus become $H_2O$ and $CO_2$. In other words, by appropriately adjusting the oxygen concentration or the HC component in the exhaust introduced to the NSR catalyst 75, it is possible to purify HC, CO, and NOx in the exhaust. In the configuration of the present embodiment, adjustment of the oxygen concentration or the HC component in the exhaust can be performed with an operation to add fuel from the aforementioned fuel addition valve 26.

On the other hand, in the DPNR catalyst 76, a NOx storage reduction catalyst is supported on a porous ceramic structure, for example, and PM in exhaust gas is captured when passing through a porous wall. When the air-fuel ratio of the exhaust gas is lean, NOx in the exhaust gas is stored in the NOx storage reduction catalyst, and when the air-fuel ratio is rich, the stored NOx is reduced and released. Furthermore, a catalyst that oxidizes/burns the captured PM (for example, an oxidization catalyst whose main component is a precious metal such as platinum) is supported on the DPNR catalyst 76.

Here, the combustion chamber 3 of the diesel engine and parts in the vicinity of the combustion chamber 3 will be described with reference to FIG. 2. As shown in FIG. 2, in a cylinder block 11 that constitutes part of the main body of the engine, a cylindrical cylinder bore 12 is formed in each cylinder (each of four cylinders), and a piston 13 is housed within each cylinder bore 12 such that the piston 13 can slide in the vertical direction.

The aforementioned combustion chamber 3 is formed on the top side of a top face 13a of the piston 13. More specifically, the combustion chamber 3 is partitioned by a lower face of the cylinder head 15 installed on top of the cylinder block 11 via a gasket 14, an inner wall face of the cylinder bore 12, and the top face 13a of the piston 13. A cavity 13b is concavely provided in approximately the center of the top face 13a of the piston 13, and this cavity 13b also constitutes part of the combustion chamber 3.

A small end 18a of a connecting rod 18 is linked to the piston 13 by a piston pin 13c, and a large end of the connecting rod 18 is linked to a crank shaft that is an engine output shaft. Thus, back and forth movement of the piston 13 within the cylinder bore 12 is transmitted to the crank shaft via the connecting rod 18, and engine output is obtained due to rotation of this crank shaft. Also, a glow plug 19 is disposed facing the combustion chamber 3. The glow plug 19 glows due to the flow of electrical current immediately before the engine 1 is started, and functions as a starting assistance apparatus whereby ignition and combustion are promoted due to part of a fuel spray being blown onto the glow plug.

In the cylinder head 15, the intake port 15a that introduces air to the combustion chamber 3 and the exhaust port 71 that discharges exhaust gas from the combustion chamber 3 are respectively formed, and an intake valve 16 that opens/closes the intake port 15a and an exhaust valve 17 that opens/closes the exhaust port 71 are disposed. The intake valve 16 and the exhaust valve 17 are disposed facing each other on either side of a cylinder center line P. That is, this engine is configured as a cross flow-type engine. Also, the injector 23 that injects fuel directly into the combustion chamber 3 is installed in the cylinder head 15. The injector 23 is disposed in approximately the center above the combustion chamber 3, in an erect orientation along the cylinder center line P, and injects fuel introduced from the common rail 22 toward the combustion chamber 3 at a predetermined timing.

Furthermore, as shown in FIG. 1, a turbocharger 5 is provided in the engine 1. This turbocharger 5 is provided with a turbine wheel 5B and a compressor wheel 5C that are linked via a turbine shaft 5A. The compressor wheel 5C is disposed facing the inside of the intake tube 64, and the turbine wheel 5B is disposed facing the inside of the exhaust tube 73. Thus the turbocharger 5 uses exhaust flow (exhaust pressure) received by the turbine wheel 5B to rotate the compressor wheel 5C, thereby performing a so-called turbocharging operation that increases the intake pressure. In this embodiment, the turbocharger 5 is a variable nozzle-type turbocharger, in which a variable nozzle vane mechanism (not shown) is provided on the turbine wheel 5B side, and by adjusting the opening degree of this variable nozzle vane it is possible to adjust the turbocharging pressure of the engine 1.

An intercooler 61 for forcibly cooling intake air heated due to supercharging with the turbocharger 5 is provided in the intake tube 64 of the intake system 6. The throttle valve 62 provided on the downstream side from the intercooler 61 is an electronically controlled opening/closing valve whose opening degree is capable of stepless adjustment, and has a function to constrict the area of the channel of intake air under predetermined conditions, and thus adjust (reduce) the supplied amount of intake air.

Also, an exhaust gas recirculation path (EGR path) 8 is provided that connects the intake system 6 and the exhaust system 7. The EGR path 8 decreases the combustion temperature by appropriately recirculating part of the exhaust to the intake system 6 and resupplying that exhaust to the combustion chamber 3, thus reducing the amount of NOx produced. Also, provided in the EGR path 8 are an EGR valve 81 that by being opened/closed continuously under electronic control is capable of freely adjusting the amount of exhaust flow that flows through the EGR path 8, and an EGR cooler 82 for cooling exhaust that passes through (recirculates through) the EGR path 8.

—Sensors—

Various sensors are installed in respective parts of the engine 1, and these sensors output signals related to environmental conditions of the respective parts and the operating state of the engine 1.

For example, the above airflow meter 43 outputs a detection signal according to an intake air flow amount (intake air amount) on the upstream side of the throttle valve 62 within the intake system 6. An intake temperature sensor 49 is disposed in the intake manifold 63, and outputs a detection signal according to the temperature of intake air. An intake pressure sensor 48 is disposed in the intake manifold 63, and outputs a detection signal according to the intake air pressure. An A/F (air-fuel ratio) sensor 44 outputs a detection signal that continuously changes according to the oxygen concentration in exhaust on the downstream side of the maniverter 77 of the exhaust system 7. An exhaust temperature sensor 45 likewise outputs a detection signal according to the temperature of exhaust gas (exhaust temperature) on the downstream side of the maniverter 77 of the exhaust system 7. A rail pressure sensor 41 outputs a detection signal according to the pressure of fuel accumulated in the common rail 22. A throttle opening degree sensor 42 detects the opening degree of the throttle valve 62.

—ECU—

Figure 3:
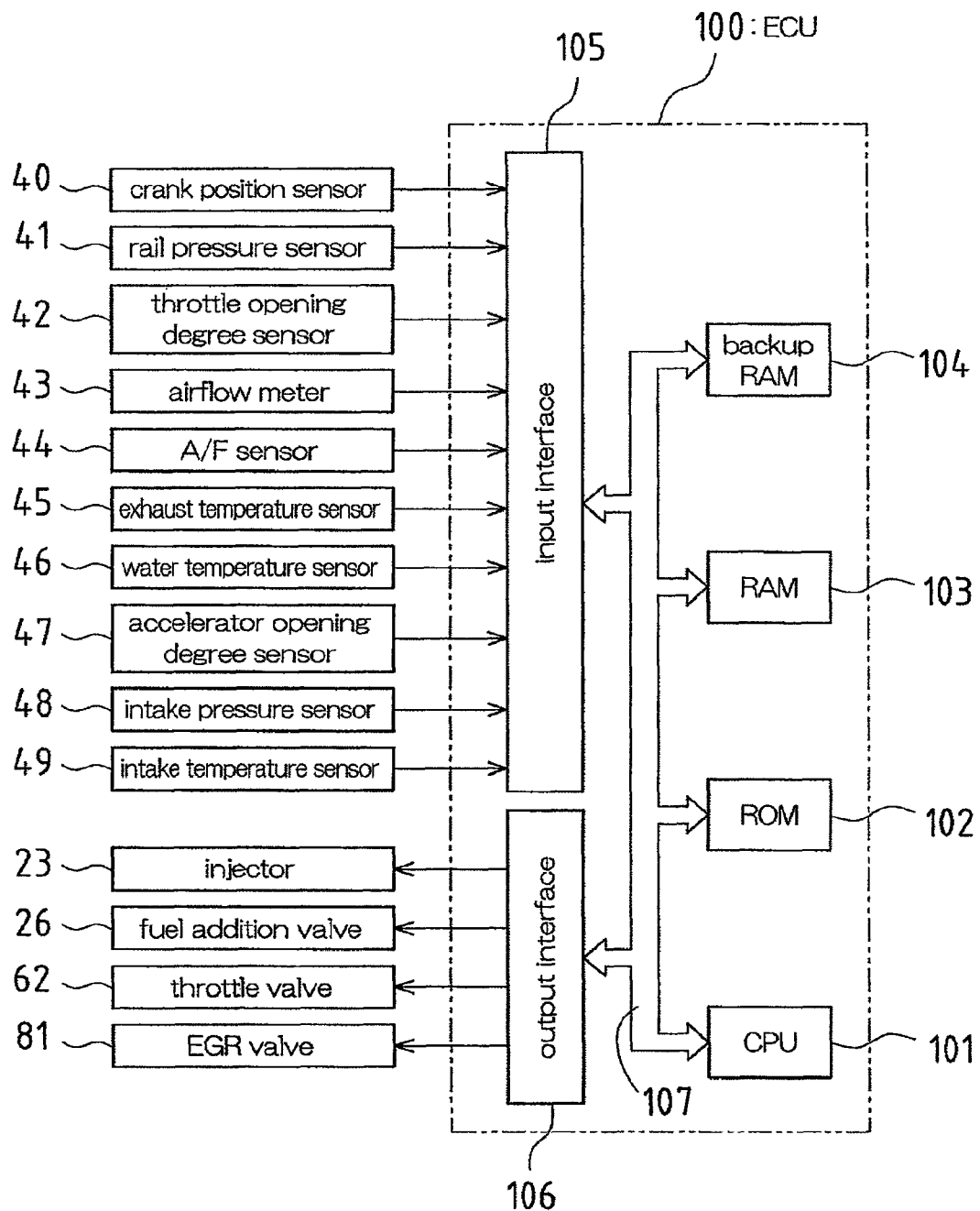

As shown in FIG. 3, the ECU 100 is provided with a CPU 101, a ROM 102, a RAM 103, a backup RAM 104, and the like. In the ROM 102, various control programs, maps that are referred to when executing those various control programs, and the like are stored. The CPU 101 executes various computational processes based on the various control programs and maps stored in the ROM 102. The RAM 103 is a memory that temporarily stores data resulting from computation with the CPU 101 or data that has been input from the respective sensors, and the backup RAM 104, for example, is a nonvolatile memory that stores that data or the like to be saved when the engine 1 is stopped.

The CPU 101, the ROM 102, the RAM 103, and the backup RAM 104 are connected to each other via a bus 107, and are connected to an input interface 105 and an output interface 106 via the bus 107.

The rail pressure sensor 41, the throttle opening degree sensor 42, the airflow meter 43, the A/F sensor 44, the exhaust temperature sensor 45, the intake pressure sensor 48, and the intake temperature sensor 49 are connected to the input interface 105. Further, a water temperature sensor 46, an accelerator opening degree sensor 47, a crank position sensor 40, and the like are connected to the input interface 105. The water temperature sensor 46 outputs a detection signal according to the coolant water temperature of the engine 1, the accelerator opening degree sensor 47 outputs a detection signal according to the amount that an accelerator pedal is depressed, and the crank position sensor 40 outputs a detection signal (pulse) each time that an output shaft (crank shaft) of the engine 1 rotates a fixed angle. On the other hand, the aforementioned injectors 23, fuel addition valve 26, throttle valve 62, EGR valve 81, and the like are connected to the output interface 106.

The ECU 100 executes various control of the engine 1 based on the output of the various sensors described above. Furthermore, the ECU 100 executes pilot injection control, described below, as control of fuel injection of the injectors 23.

—Pilot Injection Control—

Next is a description of pilot injection control of the injectors 23.

This pilot injection (sub injection) is an injection operation that pre-injects a small amount of fuel prior to main injection from the injectors 23. More specifically, after execution of this pilot injection, fuel injection is temporarily interrupted, the temperature of compressed gas (temperature in the cylinder) is adequately increased to reach the fuel self-ignition temperature before main injection is started, and thus ignition of fuel injected by main injection is well-insured. That is, the function of pilot injection in the present embodiment is specialized for preheating the inside of the cylinder.

The fuel injection pressure when executing the pilot injection is determined by the internal pressure of the common rail 22. As the common rail internal pressure, ordinarily, the target value of the fuel pressure supplied from the common rail 22 to the injectors 23, i.e., the target rail pressure, is set to increase as the engine load increases, and as the engine revolutions increases. That is, when the engine load is high, a large amount of air is sucked into the combustion chamber 3, so pressure in the combustion chamber 3 is high and the injectors 23 are required to inject a large amount of fuel, and therefore it is necessary to set a high injection pressure from the injectors 23. Also, when the engine revolutions is high, the injection time is short, so it is necessary to inject a large amount of fuel per unit time, and therefore it is necessary to set a high injection pressure from the injectors 23. In this way, the target rail pressure is ordinarily set based on the engine load and the engine revolutions.

The optimum values of fuel injection parameters for fuel injection such as the above pilot injection, main injection, and the like differ according to the engine, temperature conditions of intake air, and the like.

For example, the ECU 100 adjusts the amount of fuel discharged by the supply pump 21 such that the common rail pressure becomes the same as the target rail pressure set based on the engine operating state, i.e., such that the fuel injection pressure matches the target injection pressure. Also, the ECU 100 determines the fuel injection amount and the form of fuel injection based on the engine operating state. Specifically, the ECU 100 calculates an engine rotational speed based on the value detected by the crank position sensor 40 and obtains an amount of accelerator pedal depression (accelerator opening degree) based on the value detected by the accelerator opening degree sensor 47, and determines the fuel injection amount based on the engine rotational speed and the accelerator opening degree.

Furthermore, the ECU 100 sets various injection modes in which the forms of fuel injection, pilot injection, pre-injection, main injection, after-injection, and post injection are appropriately combined. Following is a general description of the operation of the pilot injection, pre-injection, main injection, after-injection, and post injection in the present embodiment.

(Pilot Injection)

Pilot injection, as stated above, is an injection operation for pre-heating gas within the combustion chamber 3 (pre-heating fuel supply operation). Specifically, in this embodiment, in order to achieve an appropriate spray distribution and local concentration, an injection ratio is set to a minimum injection ratio (for example, an injection amount of 1.5 mm$^3$ per instance), and by executing pilot injection a plurality of times, a total pilot injection amount necessary in this pilot injection is insured. More specifically, the number of instances of pilot injection is determined by the following formula (1).

$$N=\{(Ca*dTs)*Kc*Kv\}/(J*Y) \quad (1)$$

(N: injection instances of pilot injection, Ca: heat capacity of air introduced into cylinder, dTs: temperature of portion that has not reached self-ignition temperature, Kc: heat capacity correction coefficient from EGR ratio, Kv: space subject to combustion contribution, J: theoretical amount of heat produced in 1.5 mm$^3$, Y heat efficiency)

Here, the temperature dTs of the portion that has not reached self-ignition temperature is the difference between the fuel self-ignition temperature and the compressed gas temperature at the target ignition timing (for example, the timing at which the piston 13 has reached the compression top dead center) of fuel during main injection, and corresponds to the amount of heat necessary to allow the compressed gas temperature at the target ignition timing to reach the fuel self-ignition temperature. Note that in the above formula (1), the pilot injection amount per one instance is set to a fixed value (for example, 1.5 mm$^3$), and by setting the number of instances of injection, the necessary total pilot injection amount is insured. This fixed value of the pilot injection amount is not limited to the value stated above.

The interval of pilot injection in which injection is divided in this manner is determined according to the response (speed of opening/closing operation) of the injectors 23. In this embodiment, the interval is set to 200 microseconds, for example. This pilot injection interval is not limited to the above value.

Furthermore, the injection start timing for this pilot injection is determined according to below formula (2), for example at a crank angle of 80 degrees or thereafter before compression top dead center (BTDC) of the piston 13.

$$\begin{aligned}&\text{Pilot injection start angle=pilot combustion end}\\&\quad\text{angle+pilot injection period working angle+}\\&\quad\text{(crank angle conversion value of combustion}\\&\quad\text{required time in one instance of pilot}\\&\quad\text{injection}*N\text{+crank angle conversion value of}\\&\quad\text{ignition delay time−crank angle conversion value}\\&\quad\text{of overlap time)} \quad (2)\end{aligned}$$

Here, the pilot combustion end angle is an angle set in order to complete combustion by pilot injection before starting pre-injection. The ignition delay time is a delay time from the time that pilot injection is executed to the time when that fuel ignites. The overlap time is an overlap time of the combustion time of fuel from previously executed pilot injection and combustion time of fuel from subsequently executed pilot injection (time during which two combustions are simultaneously being performed), and an overlap time of the combustion time of fuel from final pilot injection and the combustion time of fuel from subsequently executed pre-injection.

(Pre-Injection)

Pre-injection is an injection operation for suppressing the initial combustion speed from main injection, thus leading to stable diffusive combustion (torque-producing fuel supply operation). Specifically, in this embodiment, a pre-injection amount is set that is 10% of the total injection amount (sum of injection amount in pre-injection and injection amount in main injection) for obtaining the required torque determined according to the operating state, such as the engine revolutions, amount of accelerator operation, coolant temperature, and intake air temperature.

In this case, when the above total injection amount is less than 15 mm$^3$, the injection amount in pre-injection is less than the minimum limit injection amount (1.5 mm$^3$) of the injectors 23, so pre-injection is not executed. On the other hand, when the total injection amount of pre-injection is required to be at least twice as much as the minimum limit injection amount of the injectors 23 (for example, at least 3 mm$^3$), by executing pre-injection a plurality of times, the total injection amount necessary in this pre-injection is insured. Thus, the ignition delay of pre-injection is suppressed, suppression of the initial combustion speed from main injection is reliably performed, and so it is possible to lead to stable diffusive combustion.

The ignition start angle for this pre-injection is set according to below formula (3).

$$\begin{aligned}&\text{Pre-injection start angle=pre-combustion end angle+}\\&\quad\text{pre-injection period working angle+(crank angle}\\&\quad\text{conversion value of combustion required time in}\\&\quad\text{pre-injection+crank angle conversion value of}\\&\quad\text{ignition delay time−crank angle conversion value}\\&\quad\text{of overlap time)} \quad (3)\end{aligned}$$

Here, the ignition delay time is a delay time from the time that pre-injection is executed to the time when that fuel ignites. The overlap time is, when pre-injection is performed a plurality of times, an overlap time of the combustion time of fuel from previously executed pre-injection and combustion time of fuel from subsequently executed pre-injection (time during which two combustions are simultaneously being performed), and an overlap time of the combustion time of fuel from final pre-injection and the combustion time of fuel from subsequently executed main injection, and also an overlap time of the combustion time of fuel from final pilot injection and the combustion time of fuel from pre-injection.

(Main Injection)

Main injection is an injection operation for producing torque of the engine 1 (torque-producing fuel supply operation). Specifically, in this embodiment, an injection amount is set that is obtained by subtracting the injection amount in the above pre-injection from the above total injection amount for obtaining the required torque determined according to the operating state, such as the engine revolutions, amount of accelerator operation, coolant temperature, and intake air temperature.

Also, the injection start angle for this main injection is set according to below formula (4).

$$\text{Main injection start angle} = \text{main injection timing} + \text{main injection period working angle} + (\text{crank angle conversion value of combustion required time in main injection} + \text{crank angle conversion value of ignition delay time} - \text{crank angle conversion value of overlap time}) \quad (4)$$

Here, the ignition delay time is a delay time from the time that main injection is executed to the time when that fuel ignites. The overlap time is an overlap time of the combustion time of fuel from the above pre-injection and the combustion time of fuel from main injection, and an overlap time of the combustion time of fuel from main injection and the combustion time of fuel from after-injection.

(After-Injection)

After-injection is an injection operation for increasing the exhaust gas temperature. Specifically, in this embodiment, the combustion energy of fuel supplied by after-injection is not converted to engine torque, rather, after-injection is executed at a timing such that the majority of that combustion energy is obtained as exhaust heat energy. Also, in this after-injection as well, same as in the case of the pilot injection described above, the minimum injection ratio is set (for example, an injection amount of 1.5 mm$^3$ per instance), and by executing after-injection a plurality of times, the total after-injection amount necessary in this after-injection is insured.

(Post-Injection)

Post-injection is an injection operation for achieving increased temperature of the above maniverter 77 by directly introducing fuel to the exhaust system 7. For example, when the deposited amount of PM captured by the DPNR catalyst 76 has exceeded a predetermined amount (for example, known from detection of a before/after pressure difference of the maniverter 77), post injection is executed.

—Pilot Injection Control Operation—

Next is a description of a pilot injection control operation, this operation being a distinguishing characteristic of the present embodiment. Specifically, in this embodiment, with the below control logic a judgment is made of whether or not to execute pilot injection.

That is, first, in the compression stroke in the engine 1, a compressed gas temperature is estimated that only increases due to compression of gas in the cylinder at the target ignition timing in a case where it is assumed that the above pilot injection is not executed. Pilot injection is executed prior to the above main injection only in a case in which this estimated compressed gas temperature is compared to the fuel self-ignition temperature, and this compressed gas temperature is lower than the fuel self-ignition temperature.

In other words, when the above estimated compressed gas temperature at the target ignition timing is compared to the fuel self-ignition temperature, and that compressed gas temperature is at least the fuel self-ignition temperature, execution of the above pilot injection is prohibited.

Figure 4:
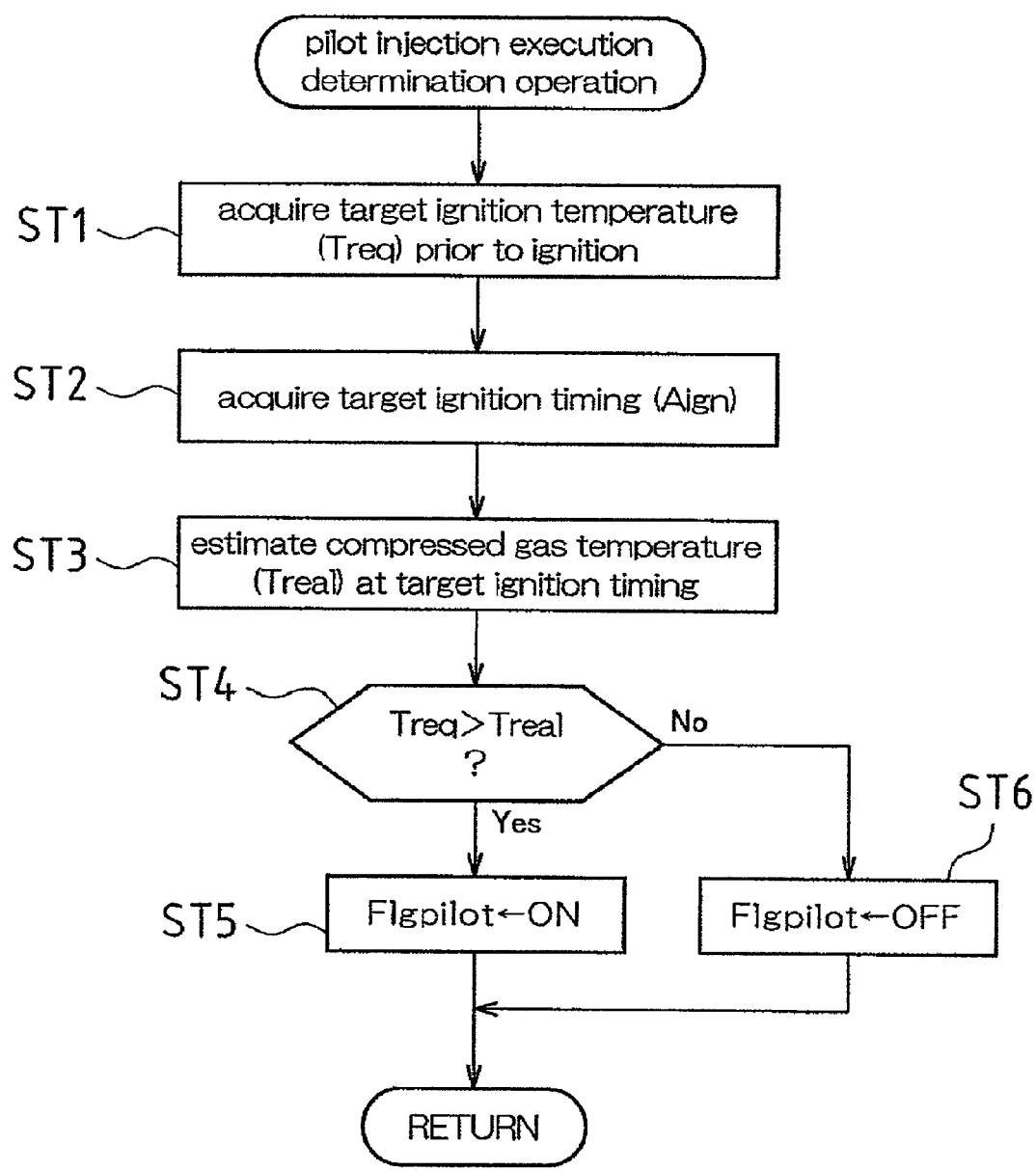
FIG. 4 is a flowchart that shows the procedure of a pilot injection execution determination operation.
Figure 5:
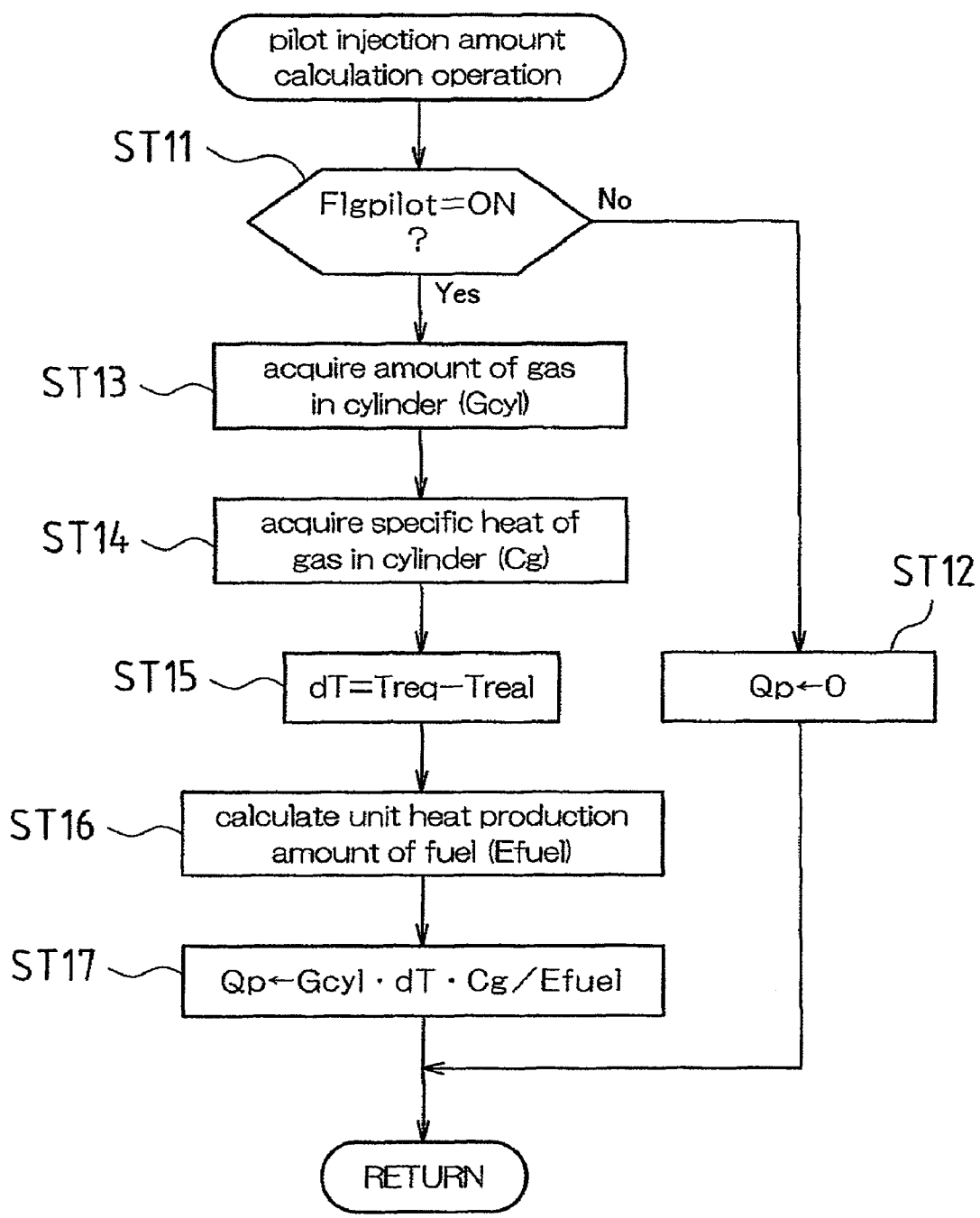
FIG. 5 is a flowchart that shows the procedure of a pilot injection amount calculation operation.

Following is a description, with reference to the flowcharts shown in FIGS. 4 and 5, of the procedure of a pilot injection control operation in which it is determined whether or not to execute this pilot injection, and according to that determination, switching between execution and non-execution of pilot injection is performed.

FIG. 4 is a flowchart that shows the procedure of a pilot injection execution determination operation that determines whether or not to execute pilot injection, and FIG. 5 is a flowchart that shows the procedure of a pilot injection amount calculation operation for determining the pilot injection amount when executing pilot injection.

First is a description of the pilot injection execution determination operation, with reference to FIG. 4.

In Step ST1, the target ignition temperature (Treq) prior to fuel ignition is acquired. This target ignition temperature corresponds to the fuel self-ignition temperature used in engine 1. This fuel self-ignition temperature changes according to the pressure within the combustion chamber 3. That is, the fuel self-ignition temperature decreases as the pressure within the combustion chamber 3 increases. Therefore, for example, a target ignition temperature map for obtaining the target ignition temperature according to the pressure within the combustion chamber 3 is stored in the aforementioned ROM 102, and the target ignition temperature (Treq) is acquired by referring to this target ignition temperature map.

Afterward, in Step ST2, the target ignition timing (Aign) is acquired. This is acquired as the piston position at the fuel ignition start timing that accompanies main injection when main injection has been performed. For example, this is set as the compression top dead center (crank angle CA=0 degrees) or the like (setting of target ignition timing by target ignition timing setting portion). This target ignition timing (Aign) is not limited to being set to the compression top dead center of the piston 13, and for example may be set to an appropriately later angle according to exhaust emissions. That is, in the case of operation in which torque of the engine 1 is considered important, the target ignition timing is set near the compression top dead center, and in the case of operation in which suppression of the amount of NOx exhaust is considered important, the target ignition timing is set to an angle later than the compression top dead center.

In Step ST3, the compressed gas temperature (Treal) at the target ignition timing acquired in above Step ST2 is estimated (operation estimating compressed gas temperature by compressed gas temperature identification portion). This compressed gas temperature only increases due to compression of gas in the cylinder during the compression stroke in a case where it is assumed that pilot injection is not executed, that is, in a case where it is assumed that there is no increase in gas temperature caused by pilot injection. As described above, when the target ignition timing (Aign) is acquired as the compression top dead center of the piston 13, it is acquired as the compressed gas temperature at the point in time that the compression chamber volume is smallest.

Specifically, as this compressed gas temperature estimation operation, the compressed gas temperature (Treat) at the target ignition timing is estimated from the intake air pressure detected by the above intake pressure sensor 48 and the intake air temperature detected by the intake temperature sensor 49. This estimation is performed by calculation according to a predetermined computational formula, or by referring to a map that has been stored in advance in the ROM 102.

After the target ignition temperature (Treq) and the compressed gas temperature (Treal) at the target ignition timing have been acquired as described above, the procedure moves to Step ST4. In Step ST4, the target ignition temperature and the compressed gas temperature are compared, and a determination is made of whether or not the compressed gas temperature is less than the target ignition temperature (Treq>Treal).

When the compressed gas temperature is less than the target ignition temperature and therefore a determination of Yes is made in Step ST4, the procedure moves to Step ST5, and a pilot injection execution flag (Flgpilot) is set to ON. That is, pilot injection is executed prior to main injection (pilot injection execution setting operation by pilot injection control portion). On the other hand, when the compressed gas temperature is at least the target ignition temperature, and therefore a determination of No is made in Step ST4, the procedure moves to Step ST6, and the pilot injection execution flag (FlgPilot) is set to OFF. That is, pilot injection is not executed prior to main injection (pilot injection prohibited: pilot injection non-execution setting operation by sub injection control portion).

Figure 6:
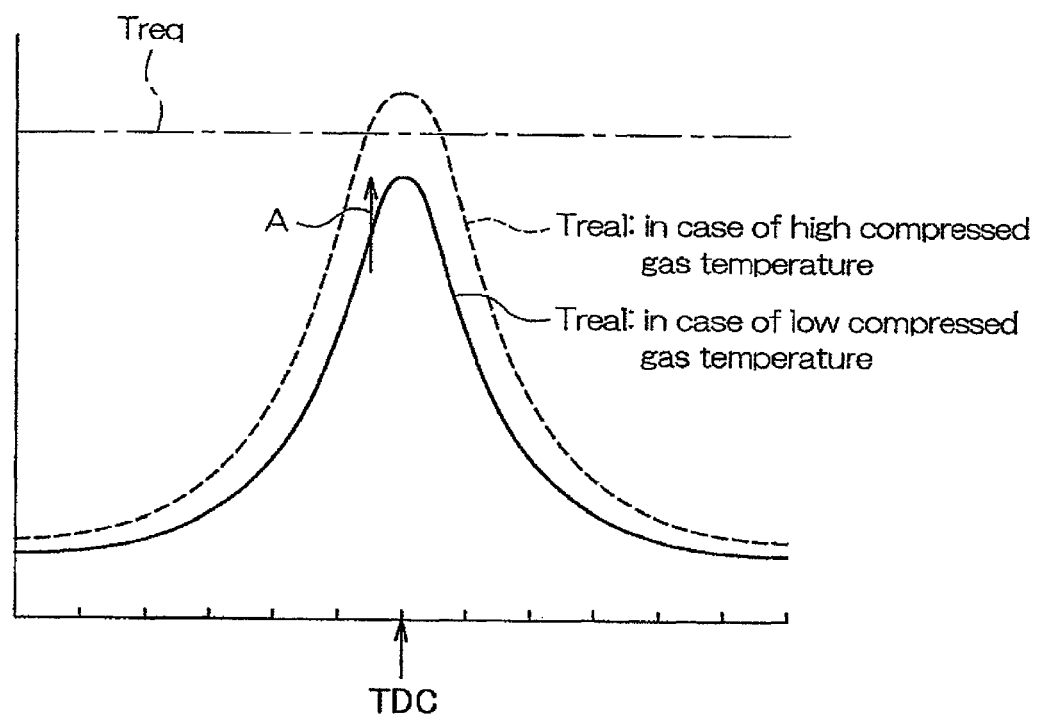
FIG. 6 shows the state of change of a target ignition temperature and a compressed gas temperature when a target ignition timing has been set to a compression top dead center of a piston.

FIG. 6 shows the state of change of the target ignition temperature (Treq) and the compressed gas temperature (Treal) when the target ignition timing (Aign) has been set to the compression top dead center (TDC) of the piston 13. In FIG. 6, a single-dotted chained line indicates the target ignition temperature (Treq). Also, in FIG. 6, as the compressed gas temperature (Treal), the change in compressed gas temperature in a case where the compressed gas temperature at the compression top dead center of the piston 13 is less than the target ignition temperature is indicated by a solid line, and the change in compressed gas temperature in a case where the compressed gas temperature at the compression top dead center of the piston 13 is at least the target ignition temperature is indicated by a broken line.

That is, as indicated by the solid line in FIG. 6, in a case when the compressed gas temperature (Treal) at the target ignition timing (TDC) is less than the target ignition temperature (Treq), pilot injection is executed, and as indicated by arrow A in FIG. 6, the compressed gas temperature (Treal) is set to approach the target ignition temperature (Treq). On the other hand, as indicated by the broken line in FIG. 6, in a case when the compressed gas temperature (Treal) at the target ignition timing (TDC) is at least the target ignition temperature (Treq), pilot injection is not executed.

After the pilot injection execution flag has been set in this way, the pilot injection amount calculation operation shown in FIG. 5 is executed.

In this pilot injection amount calculation operation, first, in Step ST11, a determination is made of whether or not the above pilot injection execution flag (Flgpilot) is in the ON state. When the pilot injection execution flag is in the OFF state, and therefore a determination of No is made in Step ST11, the procedure moves to Step ST12, and the pilot injection amount (Qp) is set to "0". That is, the pilot injection amount is set to non-execution.

On the other hand, when the pilot injection execution flag is in the ON state, and therefore a determination of Yes is made in Step ST11, the procedure moves to Step ST13, and an in-cylinder gas amount (Gcyl) is acquired.

Afterward, the procedure moves to Step ST14, and the specific heat (Cg) of gas present in the cylinder is acquired.

Afterward, the procedure moves to Step ST15, and a required temperature difference (dT) is obtained from below formula (5).

$$dT = Treq - Treal \quad (5)$$

Then the procedure moves to Step ST16, and the amount of heat produced per unit volume of the fuel being used (Efuel) is calculated.

In this way, the in-cylinder gas amount (Gcyl) and the gas specific heat (Cg) are acquired, and the required temperature difference (dT) and the amount of heat produced per unit volume of the fuel (Efuel) are calculated, and then, in Step ST17, the pilot injection amount (Qp) is calculated from below formula (6).

$$Qp = Gcyl * dT * Cg / Efuel \quad (6)$$

The pilot injection amount is obtained by the above operation, and the injectors 23 are controlled such that at a predetermined pilot injection timing, pilot injection is executed with this calculated pilot injection amount. That is, the injectors 23 are controlled such that, as described above, by executing pilot injection a plurality of times with the minimum injection ratio (for example, an injection amount of 1.5 mm$^3$ per instance), the total pilot injection amount (Qp) necessary in this pilot injection is insured.

When pilot injection is executed in this way, when the pilot total injection amount is required to be at least twice as much as the minimum limit injection amount of the injectors 23, as described above, by executing pilot injection a plurality of times, the total injection amount necessary in this pilot injection is insured. Thus, it is possible to adequately increase the compressed gas temperature, thereby allowing the compressed gas temperature to reach the fuel self-ignition temperature, prior to the start of main injection.

As described above, in this embodiment, a compressed gas temperature is estimated that only increases due to compression of gas in the cylinder at the target ignition timing in a case where it is assumed that pilot injection is not executed. This estimated compressed gas temperature is compared to the fuel self-ignition temperature, and pilot injection is executed prior to the above main injection only when the compressed gas temperature is lower than the fuel self-ignition temperature. Therefore, it is possible to execute pilot injection only in a case where pilot injection is necessary in order to insure ignition of fuel in main injection, so wasteful pilot injection can be avoided. As a result, it is possible to prevent worsening of exhaust emissions caused by executing pilot injection more than is necessary, and worsening of the rate of fuel consumption.

Modified Example 1

Next is a description of Modified Example 1 of the invention. In the above embodiment, information of an estimated compressed gas temperature is used for a determination of whether or not to execute pilot injection performed prior to main injection immediately after the compression stroke for which this estimation was performed. That is, information of the estimated compressed gas temperature acquired in the compression stroke is used for a determination of whether or not to execute pilot injection performed prior to main injection immediately after that compression stroke.

In Modified Example 1, instead, the information of the compressed gas temperature is used for a determination of whether or not to execute pilot injection performed prior to main injection in the next cylinder (the next cylinder to enter an expansion stroke after the expansion stroke of the cylinder for which the compressed gas temperature information was acquired).

In this case, as the operation to estimate the compressed gas temperature, same as in the case of the embodiment described above, the compressed gas temperature (Treal) at the target ignition timing is estimated from the intake air pressure detected by the above intake pressure sensor 48 and the intake air temperature detected by the intake temperature sensor 49.

Also, instead of this estimation operation, it is possible to provide an in-cylinder pressure sensor within the cylinder, and obtain the compressed gas temperature (Treal) at the target ignition timing from the intake air pressure detected by this in-cylinder sensor and the intake air temperature detected by the intake temperature sensor 49. In particular, in the case of a state in which pilot injection is not executed, and in which the in-cylinder pressure prior to ignition of fuel (for example, fuel that has been injected in main injection) is detected by the in-cylinder pressure sensor, and that information is used for a determination of whether or not to execute pilot injection performed prior to main injection in the next cylinder, it is possible to detect the actual in-cylinder pressure with the in-cylinder sensor, and obtain the compressed gas temperature (Treal) based on the information from that detection. Because that information is reflected in the next cylinder, a time delay of the control operation does not occur.

Modified Example 2

Next is a description of Modified Example 2 of the invention. In the above embodiment, information of an estimated compressed gas temperature is used for a determination of whether or not to execute pilot injection performed prior to main injection immediately after the compression stroke for which this estimation was performed. That is, the information of the compressed gas temperature acquired in the compression stroke is used for a determination of whether or not to execute pilot injection performed prior to main injection immediately after that compression stroke. Also, in above Modified Example 1, the information of the compressed gas temperature is used for a determination of whether or not to execute pilot injection performed prior to main injection in the next cylinder.

In Modified Example 2, instead, the information of the compressed gas temperature is used for a determination of whether or not to execute pilot injection performed prior to main injection that is immediately after the next instance of the compression stroke for this cylinder (the same cylinder for which the compressed gas temperature was acquired).

In the case of Modified Example 2 as well, same as in Modified Example 1, it is possible to provide an in-cylinder pressure sensor within the cylinder, and obtain the compressed gas temperature (Treal) at the target ignition timing from the intake air pressure detected by this in-cylinder sensor and the intake air temperature detected by the intake temperature sensor 49. That is, also in Modified Example 2, same as in the case of Modified Example 1, it is possible to detect the actual in-cylinder pressure with the in-cylinder sensor, and obtain the compressed gas temperature (Treal) based on the information from that detection. Because that information is reflected in the determination of whether or not to execute pilot injection performed prior to main injection that is immediately after the next instance of the compression stroke for this cylinder, a time delay of the control operation does not occur.

Other Embodiments

In the embodiment and modified examples described above, a case was described in which the invention is applied to an in-line four cylinder diesel engine mounted in an automobile. The invention is not limited to use in an automobile, and is also applicable to engines used in other applications. Also, the number of cylinders and the form of the engine (in-line engine, V-type engine, or the like) is not particularly limited.

Further, in the above embodiment and modified examples, the maniverter 77 is provided with the NSR catalyst 75 and the DPNR catalyst 76, but a maniverter 77 provided with the NSR catalyst 75 and a DPF (Diesel Particulate Filter) may also be adopted.

Also, in the above embodiment and modified examples, at each instance of the compression stroke of each cylinder, by comparing the compressed gas temperature and the fuel self-ignition temperature, a determination is made of whether or not pilot injection is necessary. The invention is not limited to this; a configuration may be adopted in which at each passage of a predetermined time, or at each instance of a predetermined compression stroke, by comparing the compressed gas temperature and the fuel self-ignition temperature, a determination is made of whether or not pilot injection is necessary. By adopting such a configuration, for example, in the cooling time or the like of the engine 1, there is an increased possibility that a condition in which the above compressed gas temperature is less than the fuel self-ignition temperature will continue, and therefore that a condition in which pilot ignition is necessary will continue. In such a condition, it is not necessary to determine whether or not pilot ignition is necessary at each instance of the compression stroke, so by determining whether or not pilot ignition is necessary at each passage of a predetermined time, or at each instance of a predetermined compression stroke, it is possible to achieve greater efficiency for the determination operation.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority under 35 U.S.C. Section 119(a) on Japanese Patent Application No. 2007-316993 filed in Japan on Dec. 7, 2007, the entire contents of which are herein incorporated by reference. Furthermore, the entire contents of references cited in the present description are herein specifically incorporated by reference.

This application claims priority under 35 U.S.C. Section 119(a) on Japanese Patent Application No. 2007-316993 filed in Japan on Dec. 7, 2007, the entire contents of which are herein incorporated by reference. Furthermore, the entire contents of references cited in the present description are herein specifically incorporated by reference.

The invention claimed is:

1. A fuel injection control apparatus of a compression self-igniting internal combustion engine that, as an operation to inject fuel from a fuel injection valve, is capable of executing at least a main injection and a sub injection that is performed prior to the main injection, the fuel injection control apparatus comprising:

a compressed gas temperature identification portion that estimates or detects a compressed gas temperature that only increases due to compression of gas in a cylinder during a compression stroke in a case where it is assumed that the sub injection is not executed; and a sub injection control portion that compares the compressed gas temperature estimated or detected by the compressed gas temperature identification portion to a fuel self-ignition temperature, and executes the sub injection prior to the main injection only when the compressed gas temperature is lower than the fuel self-ignition temperature.

2. A fuel injection control apparatus of a compression self-igniting internal combustion engine that, as an operation to inject fuel from a fuel injection valve, is capable of executing at least a main injection and a sub injection that is performed prior to the main injection, the fuel injection control apparatus comprising:
  a compressed gas temperature identification portion that estimates or detects a compressed gas temperature that only increases due to compression of gas in a cylinder during a compression stroke in a case where it is assumed that the sub injection is not executed; and
  a sub injection control portion that compares the compressed gas temperature estimated or detected by the compressed gas temperature identification portion to a fuel self-ignition temperature, and prohibits execution of the sub injection when the compressed gas temperature is at least the fuel self-ignition temperature.

3. The fuel injection control apparatus of an internal combustion engine according to claim 1, further comprising:
  a target ignition timing setting portion that sets a target ignition timing at which fuel is ignited by the main injection;
  wherein the compressed gas temperature identification portion estimates or detects the compressed gas temperature at the target ignition timing that has been set by the target ignition timing setting portion.

4. The fuel injection control apparatus of an internal combustion engine according to claim 1, wherein the sub injection control portion, when executing sub injection, sets a larger total fuel injection amount for sub injection as the difference between the compressed gas temperature and the fuel self-ignition temperature increases.

5. The fuel injection control apparatus of an internal combustion engine according to claim 4, wherein the sub injection control portion divides the total fuel injection amount for sub injection set based on the difference between the compressed gas temperature and the fuel self-ignition temperature into a plurality of instances of injection and performs injection intermittently.

* * * * *

UNITED STATES PATENT AND TRADEMARK OFFICE
CERTIFICATE OF CORRECTION

PATENT NO. : 8,387,586 B2  Page 1 of 1
APPLICATION NO. : 12/746404
DATED : March 5, 2013
INVENTOR(S) : Matsunaga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this
First Day of September, 2015

Michelle K. Lee
*Director of the United States Patent and Trademark Office*